United States Patent [19] [11] 4,312,962
Campbell et al. [45] Jan. 26, 1982

[54] ADHESION IN METAL PLATING

[75] Inventors: Joseph O. Campbell, Springfield; Marie Y. Jean-Pierre, Shrewsbury, both of Mass.

[73] Assignee: Monsanto Company, St. Louis, Mo.

[21] Appl. No.: 237,229

[22] Filed: Feb. 23, 1981

[51] Int. Cl.³ ............... C08L 55/02; C08L 35/06; C08K 5/10

[52] U.S. Cl. .................... 525/5; 525/74; 428/462; 428/463

[58] Field of Search ........................ 525/5, 74

[56] References Cited

U.S. PATENT DOCUMENTS

| | | | |
|---|---|---|---|
| 3,642,949 | 2/1972 | Stafford et al. | 525/74 |
| 3,896,252 | 7/1975 | Tuttle | 427/306 |
| 3,919,354 | 11/1975 | Moore et al. | 260/880 R |
| 3,966,842 | 6/1976 | Ludwig | 260/873 |
| 4,167,543 | 9/1979 | Ziebig et al. | 525/74 |
| 4,197,376 | 4/1980 | Lee et al. | 525/74 |

OTHER PUBLICATIONS

Mod. Plastics Encyclopedia, 1980–1981, p. 708, "Plasticizers".

*Primary Examiner*—Carman J. Seccuro
*Attorney, Agent, or Firm*—David Bennett; William J. Farrington; Paul D. Matukaitis

[57] ABSTRACT

The adhesion between a metal plating and a polymeric substrate comprising an ABS blended with a strene/maleic anhydride polymer, is greatly increased by incorporating into the substrate a $C_1$ to $C_6$ ester of a $C_{12}$ to $C_{20}$ fatty acid.

5 Claims, No Drawings

ADHESION IN METAL PLATING

BACKGROUND OF THE INVENTION

The present invention relates to a method of improving the adhesion between a plastic substrate and a layer of metal that has been electroplated thereon.

More particularly the invention relates to improving the adhesion between metal plating and a polymeric composition comprising an ABS polymer and a copolymer of vinylaromatic monomer such as styrene and a unsaturated dicarboxylic acid anhydride such as maleic anhydride.

Resins of the above type have excellent molding characteristics and impact strength. This makes them well adapted to the production of metal plated moldings for use in items such as automobile brightwork and appliance trim. For a brightwork part the most important characteristics are the quality of the surface and the bond between the metal plating and substrate. A perfect finish on a plated part is rendered worthless if the plating breaks off when the part is struck or flexed slightly. For many otherwise suitable polymer substrates, it is precisely in this characteristic of adhesion to a metal electroplated thereon that the performance is found wanting.

DESCRIPTION OF THE PRIOR ART

The method of the invention is applicable to polymer compositions comprising a blend of
A. a copolymer of a vinylaromatic monomer and an ethylenically unsaturated dicarboxylic acid anhydride with or without a termonomer and with or without rubber reinforcement and
B. an ABS copolymer Polymer compostions providing Component A and methods by which they can be prepared are described for example in U.S. Pat. Nos. 2,971,939; 3,336,267; and 3,919,354. Blends of such polymers with ABS are described in U.S. Pat. Nos. 3,642,949 and 4,197,376.

In a conventional operation for electroplating plastics, the surface of the substrate is subjected to a special treatment with the object of increasing the resultant adhesion. One such treatment technique, applied to the surface of a polymer of the type discussed above, is described in U.S. Pat. No. 3,896,252.

It has now been found that certain additives which are known as plasticizers have a unique effect on the adhesion between the substrate and a metal plated thereon. This is quite unexpected since such additives are more commonly considered sources of potential adhesion problems than improvements.

DESCRIPTION OF THE INVENTION

The present invention provides a method of improving the adhesion between an electroplated metal layer and a substrate polymer composition comprising
A. at least 20% by weight of a copolymer of a vinylaromatic monomer and an ethylenically unsaturated dicarboxylic acid anhydride in a weight ratio of from 95:5 to 65:35 with from 0–20% of the copolymer weight of a copolymerizable monomer; and
B. a copolymer formed by polymerizing a vinylaromatic monomer and an unsaturated nitrile in the presence of a rubber having a glass transition temperature below 0° C.

which method comprises incorporating into the polymer composition from 0.5 to 2.5% by weight, based on the composition weight, of a $C_1$ to $C_6$ alkylester of a $C_{12}$ to $C_{20}$ saturated fatty acid or mixture of such esters.

The vinylaromatic monomer of both Components A and B is typically styrene but part or all can be replaced by α-methyl styrene, vinyl toluene or chlorostyrene or other halogenated styrene monomer. The unsaturated anhydride of Component A is most often maleic anhydride but homologous anhydrides such as aconitic, itaconic and citraconic anhydrides may be substituted.

Thus Component A is typically a copolymer of styrene and maleic anhydride or a terpolymer in which the third monomer is selected from the group consisting of acrylonitrile, methacrylonitrile and $C_1$ to $C_3$ alkyl acrylates and methacrylates. The preferred termonomer is methyl methacrylate in a proportion of 5 to 15% by weight based on the weight of the copolymerized monomers. The preferred copolymer is a terpolymer of styrene [55 to 75% by weight], maleic anhydride [20 to 30% by weight] and methyl methacrylate [5 to 15% by weight].

The monomers forming Component A can be polymerized alone or in the presence of a rubber modifier in which case the product will typically comprise the copolymer as a matrix [this being Component A] with, dispersed therein, particles of the rubber grafted with a superstrate polymer of the same composition as the matrix polymer. The rubber is typically an elastomeric substance with a glass transition temperature below 0° C. Typical rubbers include polybutadiene, polyisoprene, polychloroprene, EPDM rubbers, acrylate rubbers, copolymers of a diene with a minor amount of styrene or acrylonitrile, polypentenamer and the like. Where present the rubber weight can be up to 50% of the weight of Component A.

Component B is typically an ABS polymer though any of the known functional equivalents of the acrylonitrile butadiene and styrene components in the usual ABS can be substituted if desired. One or the other of the components of ABS can if desired be supplemented by separately prepared polymer. Thus while Component B comprises a matrix copolymer and a grafted rubber substrate by virtue of its manner of manufacture, an extra amount of matrix copolymer and/or grafted substrate can be blended in if desired to provide the final Component B formulation. Thus the matrix component could for example be a mixture of two styrene/acrylonitrile [SAN] copolymers in different ratios or an SAN copolymer and an α-methylstyrene/acrylonitrile copolymer. Likewise the grafted substrate could be provided by two different rubbers or the same rubber grafted in two distinct operations to different levels.

The proportions of Components A and B can vary widely from 20:80 to 80:20 depending on the desired properties in the final composition. In preferred compositions according to the invention the Component A represents from 30 to 60% of the combined weight of Components A and B.

The additive incorporated into the composition to improve the adhesion of metal plate thereto is a $C_1$ to $C_6$ alkyl ester of a $C_{12}$ to $C_{20}$ saturated fatty acid. Commercial fatty acid esters are rarely pure and are more commonly mixtures with one or two of the fatty acids in the homologous series predominating. It should be understood therefore that identification of a specific ester is intended to include the ester as it appears in commercial products identified by the name of that ester.

The preferred fatty acids are stearic and palmitic though other acids such as lauric, myristic and arachidic acids can also be used to form the esters. The esterifying group can be any $C_1$ to $C_6$ alkyl group but preferred groups are propyl, amyl, neopentyl, hexyl, n-butyl and tert-butyl groups and n-butyl preferred.

The composition having improved adhesion according to the teaching of the invention can comprise from 0.5 to 2.5% by weight of the fatty acid ester but most advantageously the amount of the ester will be from 1.0 to 1.5% by weight.

DESCRIPTION OF PREFERRED EMBODIMENTS

The invention is now further described with reference to the following examples which are for the purpose of illustration only and are intended to imply no limitation on the essential scope of the invention.

The examples detail the effects on adhesion of a metal plated layer on a substrate containing various commercial butyl stearates from different sources. All of these on analysis using gas chromatography proved to be mixtures, with butyl stearate and butyl palmitate between them providing at least 75% of the total weight. Generally the stearate ester was dominant.

The electroplating technique used followed typical procedures and involved preparation of 3"×5" plaques which were etched for eight minutes in a chromic/sulfuric acid bath. After neutralization and activation of the surface a nickel strike layer was electroplated onto the surface followed by a copper layer.

A one-inch wide strip of the copper layer was covered by a vinyl strip and the rest dissolved from the surface using acid.

The tape was then removed to reveal a one-inch wide strip of copper on the polymer surface. A one-inch long tab was formed by raising the strip from the surface using a razor blade. This tab was clamped in an Instron tensile tester which was set to pull at right angles to the surface of the sample with the carriage moving at one-inch per minute. The force of the pull required to separate the strip from the polymer surface was measured and recorded.

Six different compositions sold commercially as butyl stearate were analyzed by gas chromatography.
The retention times identified the major components of the mixture and the respective proportions of these components are set forth in Table 1.

TABLE 1

| | "Butyl Stearate" | | |
|---|---|---|---|
| Identific Number | Source Company | Butyl Palmitate G.C. retention time 22-minutes | Butyl Stearate G.C. retention time 25.6mins. |
| 1 | Eastman Chem. Prod. Inc. | 23.69% | 63.01% |
| 2 | Armak Co. | 41.68% | 49.39% |
| 3 | Armak Co. (Cosmetic) (Grade) | 46.86% | 48.20% |
| 4 | Sherex Chem. Company | 32.96% | 59.89% |
| 5 | Union Camp Co. | 18.67% | 56.92% |
| 6 | Emery Ind. Inc. | 51.98–59.6% | 36.38–36.1% |

Additives 1 through 4 were blended with the following formulation. (Additives 5 and 6 are given for comparative purposes).

| | |
|---|---|
| S/MA/MM - Wt. ratio (approx) 68/25/7 | 1.36 kg. |
| ABS (Rubber 33% by Wt.) | 1.59 kg. |
| (Styrene 47% by Wt.) | |
| (Acrylonitrile 20% by Wt.) | |
| Magnesium stearate | 8.9 gm. |
| 1,4,4-trimethyl-2,4,6-tri [3,5,-di-terbutyl-4-hydroxy benzyl] benzene | 8.9 gm. |
| Pigments (Code 798 White) | 16.7 gm. |
| (Code 967 Black) | 0.29 gm. |
| Butyl Stearate (Various) | 29.3 gm. |

The observed peel strengths for the above formulations (average of 4) are set forth in Table 2. For purposes of comparison the peel strength for an identical formulation except for the omission of butyl stearate is included.

TABLE 2

| Sample* | Peel Strength (Joules) |
|---|---|
| Comparative | .178 |
| 1 | .534 |
| 2 | .557 |
| 3 | .558 |
| 4 | .445 |

*Identified by the "butyl stearate" used - See Table 1

In another set of runs three different ABS materials [ABS-1, ABS-2 and ABS-3], blended from suspension grafted and emulsion grafted ABS polymers were further blended with the styrene/maleic anhydride/methyl methacrylate (S/MA/MM) terpolymer described above. These were formed into samples and after a pre-plating step were copper plated using a technique similar to that described above.

The formulations used were as follows.

| Components | Formulation 1 | 2 | 3 |
|---|---|---|---|
| S/MA/MM Terpolymer | 26.1 kg. | 106.3 kg. | 104.3 kg. |
| ABS-1 | 30.6 kg. | — | — |
| ABS-2 | — | 122.5 kg. | — |
| ABS-3 | — | — | 122.5 kg. |
| 1,3,5-trimethyl 2,4,6-tris[3,5-d-tert. butyl-4-hydroxybenzyl] benzene | 170 gms. | .68 kg. | .68 kg. |
| | | 2.95 kg. | 2.95 kg. |
| Butyl Stearate | 568 gms. | 2.95 kg. | 2.95 kg. |
| % Butyl Stearate of the weight | 1% | 1.3% | 1.3% |

The Peel Strengths observed were as follows:
Formulation 1—0.423 J (average of 4)
Formulation 2—0.723 J (average of 4)
Formulation 3—0.579 J (average of 2)

From the above data it can clearly be seen that the presence of a commercial butyl stearate greatly enhances the adhesion of the metal plate to the polymeric substrate.

What is claimed is:
1. A method of improving the adhesion between an electroplated metal layer and a substrate polymer composition comprising
   A. at least 20% by weight of a copolymer of a vinylaromatic monomer and an ethylenically unsaturated dicarboxylic acid anhydride in a weight ratio of from 95:5 to 65:35 with from 0–20% of the copolymer weight of a copolymerizable monomer; and

B. a copolymer formed by polymerizing a vinylaromatic monomer and an unsaturated nitrile in the presence of a rubber having a glass transition temperature below 0° C.

which method comprises incorporating into the polymer composition from 0.5 to 2.5% by weight, based on the composition weight, of a $C_1$ to $C_6$ alkylester of a $C_{12}$–$C_{20}$ saturated fatty acid or mixture of such esters.

2. A method according to claim 1 in which the fatty acid ester is selected from the group consisting of the butyl esters of stearic and palmitic acids.

3. A method according to either of claims 1 and 2 in which the composition further comprises a rubber grafted with the monomers providing Component A in the proportions in which they appear therein.

4. A method according to either of claims 1 and 2 in which the Component A is a terpolymer of 55 to 75% of styrene, 20 to 30% of maleic anhydride and 5 to 15% of methyl methacrylate all percentages being by weight.

5. A method according to either of claims 1 and 2 in which the components A and B are in a respective weight ratio of from 30:70 to 60:40.

* * * * *